Oct. 4, 1960 R. SHEPPARD 2,955,003
HEAVY DUTY SEGMENTAL BEARING SHOE
Filed Dec. 18, 1957
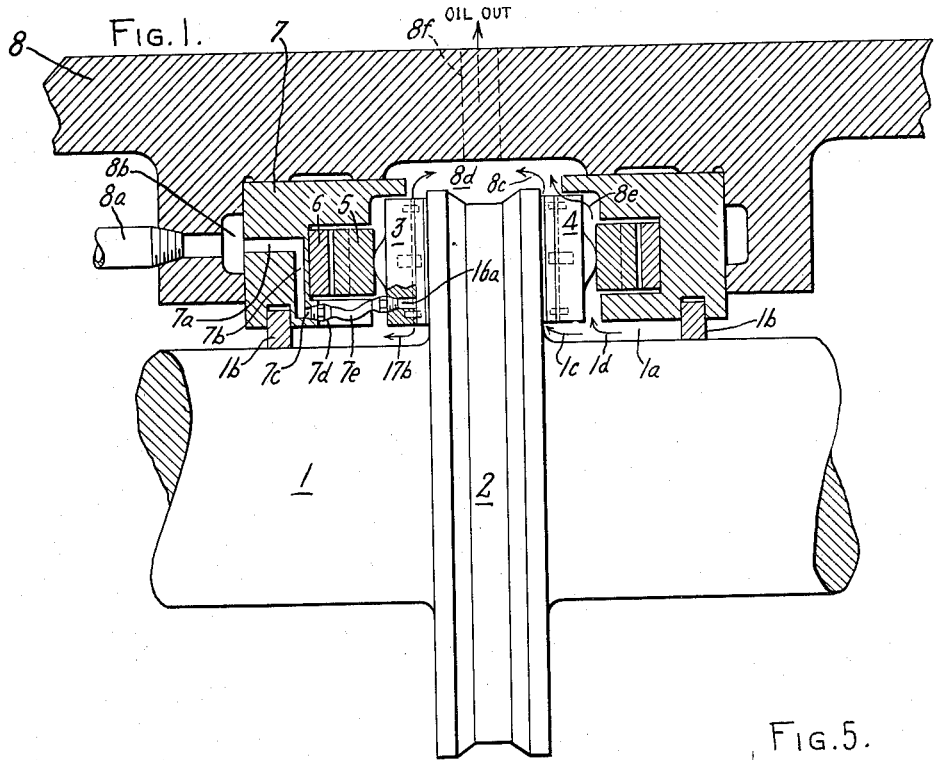
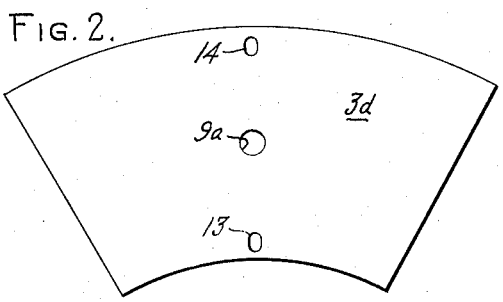
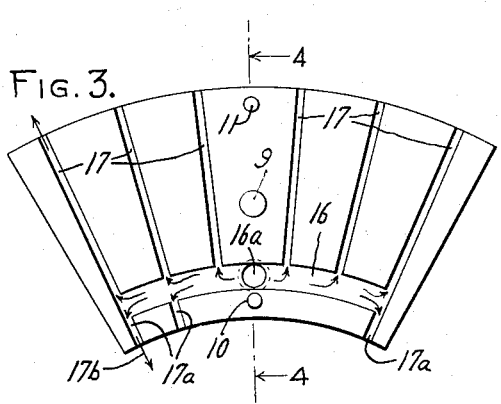
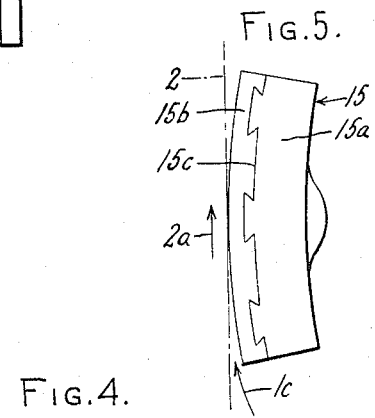
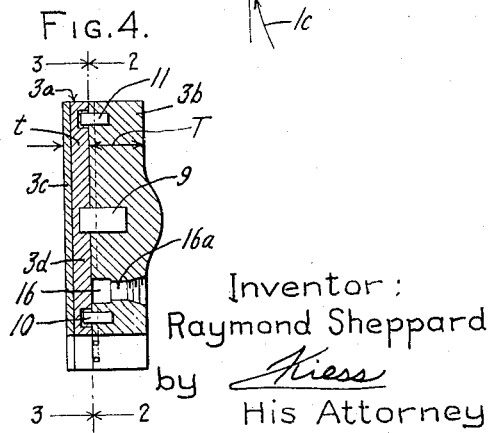
Inventor:
Raymond Sheppard
by Kiess
His Attorney

United States Patent Office 2,955,003
Patented Oct. 4, 1960

2,955,003
HEAVY DUTY SEGMENTAL BEARING SHOE

Raymond Sheppard, Schenectady, N.Y., assignor to General Electric Company, a corporation of New York Filed Dec. 18, 1957, Ser. No. 703,660

5 Claims. (Cl. 308—160)

This invention relates generally to segmental bearings and specifically to thrust bearings of the pivoted shoe or "Kingsbury" type, particularly to an improved Kingsbury type bearing in which the load-carrying capacity is greatly increased by reducing distortion of the pivoted segmental shoes.

The pivoted shoe thrust bearing has become a well-known machine element, capable of operating with bearing loadings of 1,000 to 2,000 lbs. per square inch, for bearings of moderate sizes and speeds. When such bearings are made in very large sizes, as for instance a bearing on the order of 25 to 30 inches overall diameter, as might be used in a very large steam turbine at 3600 r.p.m., it is found that the safe load-carrying capacity falls off very seriously, perhaps to as low as 600 or 700 lbs. per square inch. The purpose of the study which led to the present invention was to discover the reason for this reduction in capacity, and to make improvements which would enable such large-size bearings to have an effective load-carrying capacity at least equal to that of Kingsbury bearings of smaller sizes.

Accordingly, the purpose of the present invention is to provide an improved segmental or Kingsbury type bearing which can be built in very large sizes with effective load-carrying capacity equivalent to that obtainable with smaller bearings.

Another object is to provide an improved segmental shoe bearing in which the load-carrying capacity of the shoes remains substantially independent of the heat generated in the bearing.

A further object is to provide a special cooling system for the pivoted shoe of a Kingsbury bearing to reduce or eliminate thermal distortion.

Other objects and advantages will become apparent from the following description, taken in connection with the accompanying drawings in which Fig. 1 is a longitudinal sectional view of a pivoted shoe bearing incorporating the invention;

Fig. 2 is a plan view of one component of the special pivoted shoe employed;

Fig. 3 is a plan view of a second component of the special pivoted shoe;

Fig. 4 is a radial section taken on the plane 4—4 in Fig. 3; and

Fig. 5 is a diagrammatic representation illustrating an operating condition of a conventional Kingsbury bearing shoe, showing the reason for the reduced load-carrying capacity when conventional structures are used for very large bearings.

Generally stated, the invention is practiced by (1) dividing the segmental shoe into a comparatively thick, rigid, backing member and a comparatively thinner flexible, bearing surface member, the two being free to expand differentially as the bearing member is heated during normal operation; and (2) providing special cooling means for preventing the heat generated in the thin bearing surface member from being transmitted to the rigid backing member, whereby the latter retains its original shape irrespective of the heat generated in the bearing.

Referring now more particularly to Fig. 1, the invention is shown as applied to a Kingsbury bearing associated with a shaft 1 having a circumferentially extending flange or "runner" 2, the opposite sides of which are engaged by circumferential rows of pivoted shoe members 3, 4. As will be understood by those acquainted with this type of bearing, the pivoted shoe 3 is supported on a resilient or movable "leveling member" 5, which in turn rests on a second leveling member 6, both leveling members being retained in an annular recess in a bearing retainer member 7. The bearing retainer ring 7 is in turn supported in the bearing housing 8, in a manner which will be obvious from the drawing.

The mechanical details of the leveling members 5, 6, the retainer ring 7, etc., are purely conventional and need not be described fully herein, since the invention resides in the special construction of the pivoted shoes 3, 4 and the cooling and lubricating system. It will be observed that the pivoted shoes 4 are provided with leveling members similar to 5, 6, and are in other respects identical to the pivoted shoes 3. Therefore, only the pivoted shoe 3 and its cooling and lubricating system will be described specifically here.

As shown in Figs. 2, 3, 4, the pivoted shoe 3 actually is composed of a comparatively thin bearing surface member 3a and a comparatively thicker backing member 3b. As shown in Fig. 4, the thin, comparatively flexible wear plate or bearing surface member 3a may have a total thickness $t$ on the order of ¼ inch, with a surface layer of Babbitt or other appropriate bearing metal 3c, which may be on the order of ⅛-inch thick. The thin surface layer of bearing metal 3c may be suitably bonded, by known chemical means or other equivalent expedients, to the flexible support 3d. The thin plate 3d may be of a suitable steel, or may be of copper or bronze for improved thermal conductivity. The heavy support or backing member 3b will preferably be formed of a high-strength steel alloy, of a thickness T sufficient to give it the strength required to hold its shape irrespective of the hydraulic and mechanical forces applied to it in operation. This thickness T may be on the order of 2 inches, as compared with the thickness $t$ of the bearing surface member of ¼ inch, in a bearing having an overall diameter of 26 inches and pivoted shoes with a radial width on the order of 6 inches.

It is important to note that the thin flexible bearing surface member 3a is not firmly secured to the heavy backing member 3b, but is instead loosely pinned by a dowel 9, and two smaller radially spaced dowels 10, 11. The central dowel 9 fits tightly in a circular recess 9a formed in the rear surface of the plate 3d, as will be seen in Fig. 2. On the other hand, the dowels 10, 11 engage radially elongated holes or slots 13, 14 (Fig. 2). Thus, the thin, flexible bearing surface member 3a is completely free to expand radially and circumferentially relative to the heavy backing member 3b.

The design philosophy on which this improved bearing shoe construction is based will be seen from the following discussion of the operation of convention structures.

Fig. 5 illustrates my conception of what happens when a conventional pivoted shoe becomes overheated. In accordance with the usual practice, the shoe 15 has a heavy steel backing member 15a with a Babbitted surface 15b, the Babbitt being secured to the backing member by interlocking mechanical arrangements such as the dovetails 15c. This is perhasp the most usual construction for the pivoted shoe of a Kingsbury type bearing.

Earlier investigators who have studied the operation of the Kingsbury bearing have appreciated that in normal operation the shoe departs from its original flat condition, and assumes an arcuate configuration as shown in Fig. 5; however, they have not, in my opinion, properly analyzed the reason for the shoe assuming this convex shape. For instance, the patent to Hanzlik, 1,730,503, issued October 8, 1929, indicates a belief that this convex distortion is caused by flexing or bending of the bearing shoes due to mechanical and hydrostatic forces imposed on the shoe in operation. Hanzlik's solution was to provide an extremely thick and rigid backing member, apparently in the hope that the thicker and more rigid it was made the better it would retain its original flat shape. To compensate for the tendency of the shoe to assume a convex configuration, Hanzlik provided a surface layer of bearing material of variable thickness, relying on the "compressibility" of the thick layer of comparatively soft bearing metal to compensate for the distortion of the backing member.

It is my belief that the true reason for the convex distortion of the pivoted shoe is that friction on the bearing surface creates a temperature differential across the comparatively thick support 15 and that it is this temperature differential between the front and back surfaces which causes it to assume the convex shape shown in Fig. 5. When a surface layer 15b of a different material is employed, which may of course have a different coefficient of thermal expansion than the backing member 15a, the pivoted shoe may actually perform like a "bi-metal strip" of a thermostatic element, so that the tendency of the shoe to assume a convex configuration is increased. However, this thermal distortion will occur even if the shoe 15 is of the same material from front to back. This is because the heat is generated at the contact surface with the runner 2, whereas the remaining surfaces of the pivoted shoe are bathed by the cooling and lubricating oil. With the rearward surface of the shoe 15 strongly cooled, and the front surface strongly heated by friction, it is not surprising that a very strong tendency is observed to assume the convex shape of Fig. 5. (The drawing shows this condition to an exaggerated degree, for purpose of illustration.) It may be noted that the relative rotation of the runner 2 in Fig. 5 is indicated by the arrow 2a, which rotation drags in a film of lubricating oil, as indicated by the arrow 1c in Figs. 1 and 5.

It will now be seen that my improved pivoted shoe construction eliminates the tendency to experience the thermal distortion illustrated in Fig. 5, by separating the shoe into a thin bearing surface plate supported loosely on the heavy, rigid, backing member. Merely separating the shoe thus into the loosely supported surface plate 3a and the heavy backing member 3b will have a significant tendency to reduce the flow of heat from the bearing surface to the backing member. However, in accordance with the preferred form of my invention, the heat flow into the backing member is further prevented by providing a special cooling system, as follows.

The cooling system comprises a pattern of cooling passages formed between the backing member and bearing surface plate, as illustrated in Fig. 3. Cooling oil is supplied to an arcuate groove 16 which communicates coolant fluid to a plurality of circumferentially spaced radially extending grooves 17. A certain number of these grooves 17 continue radially inward so as to discharge at the inner periphery of the segmental block 3b. In Fig. 3, these inwardly discharging grooves are shown at 17a. An appropriate number of grooves 17a is provided to give a desired balance between the quantity of cooling oil discharged outwardly through grooves 17, as compared with the oil discharged inwardly through grooves 17a.

Lubricating oil is supplied to the distributing groove 16 by a port 16a. As will be seen in Fig. 1, cool oil is supplied by conduit 8a to an annular chamber 8b formed in the bearing housing surrounding the retainer ring 7. A plurality of axial inlet passages 7a admit oil to passages 7b, which in turn communicate with a port 7c provided with a fitting 7d and a flexible conduit 7e which is connected by a similar fitting to the inlet port 16a of the pivoted shoe.

Thus it will be seen that an adequate supply of cooling oil at suitable temperature and pressure is supplied to the pattern of cooling passages 16, 17, 17a in each pivoted shoe. It will be obvious that this coolant flow carries away the heat generated in the bearing surface plate 3a, so that it is prevented from entering the comparatively thick backing member 3b. Thus the heavy supporting member 3b is cooled on substantially all surfaces, so that no significant temperature differential develops from its front surfaces to the back. By thus equalizing the temperatures throughout the thick supporting member 3b, the tendency to experience the thermal distortion illustrated in Fig. 5 is reduced or eliminated.

With this arrangement, the hydrostatic and mechanical forces imposed on the thin and comparatively flexible bearing surface plate 3a will maintain this member tightly against the backing member 3b, and therefore the bearing plate 3a will conform to the shape of the surface of the support member 3b and maintain its preselected shape, as determined by the shape of the backing plate, regardless of the loading of the bearing and irrespective of the amount of heating produced in the thin wear plate 3a.

Thus it will be seen that the invention provides an improved pivoted shoe construction, in which the "bearing surface function" is divorced from the load-carrying function. The bearing surface member is sufficiently thin and flexible that it has little temperature drop thereacross, and is held flat against the supporting member by the forces imposed on it during operation, while the supporting member maintains its original shape by reason of elimination of extreme temperature differentials by the special cooling system.

The operation of the bearing may be summarized briefly as follows.

Oil at a suitable temperature and pressure for cooling and lubrication, which may for instance be on the order of 25 lbs. per square inch and 115° F., is supplied through conduit 8a and passages 8b, 7a, 7b, 7c, 7d and the flexible conduit 7e to each of the pivoted shoes 3, 4. The oil is distributed by the arcuate groove 16 to the cooling passages 17 and the lubricant supply passages 17a. The oil discharged from the passages 17a is represented by the arrows 17b in Figs. 1 and 3. This oil circulates around the shaft in the chamber 1a, defined between the retaining ring 7 and the shaft seals 1b. From this chamber, lubricant is dragged into the tapered clearance space developed between the pivoted shoes and the thrust runner 2, as indicated by arrow 1c in Figs. 1 and 5, and is discharged as indicated by arrow 8c into the annular chamber 8d surrounding the periphery of runner 2. Oil from the annular chamber 1a also circulates around the back and sides of the pivoted shoes, as indicated by the arrows 1d, 8e. In this connection, it will be understood that there is a substantial circumferential clearance space between the adjacent ends of the pivoted thrust shoes, thus forming radially extending passages for the flow of cooling oil from the inlet chamber 1a to the discharge chamber 8d. Spent coolant is drained from chamber 8d by way of a suitable discharge conduit 8f.

It will be apparent that the cooling arrangement shown provides means for preventing the transmission of significant quantities of heat from the thin bearing plate 3a to the thick supporting member 3b. Thus the invention keeps the thrust bearing surfaces free of the thermal distortion represented in Fig. 5. The Kingsbury type bearing may thereby be enabled to carry very high loads on large diameter bearings, comparable to the bearing loadings achieved in the past with small and medium sized bearings of the pivoted shoe type.

While a preferred embodiment of the invention has been described specifically herein, it will be obvious to those familiar with bearings of this type that the invention may take other equivalent forms. The cooling passages in the bearing shoe, the method of supplying coolant thereto, and the mechanical details of the connecting means by which the thin bearing plate is supported on the thick backing member may obviously take many different forms. It is, of course, desired to cover by the appended claims all such modifications as fall within the true spirit and scope of the invention.

What I claim as new and desire to secure by Letters Patent of the United States is:

1. A segmental bearing comprising a rotor defining an annular bearing surface, annular stationary retaining means spaced from said bearing surface, a plurality of composite bearing shoe members spaced circumferentially around the axis of rotation and adapted to engage said associated annular bearing surface, each of said composite bearing shoe members comprising a substantially inflexible support member defining a support surface, said support member being sufficiently rigid to substantially retain its shape, a relatively flexible wear plate member having one bearing surface in rubbing relation with the rotor bearing surface and an opposite surface disposed in contact with said support surface, said flexibility being such as to allow the wear plate member to conform to the shape of the support member, means connecting said wear plate member to said support member for free differential thermal expansion relative thereto, and means for circulating coolant fluid in contact with the wear plate member to remove the heat generated by friction at the rubbing surface of the wear plate member, whereby the inflexible support member is maintained at a substantially uniform temperature and retains its original shape, while the hydraulic and mechanical forces imposed on the flexible wear plate during operation cause it to contact and conform to the surface of the support member.

2. A segmental type thrust bearing comprising a rotor defining a flat thrust bearing surface, a stationary member including shoe retaining means spaced from said thrust bearing surface, a plurality of composite thrust bearing shoes, each comprising a thick and substantially inflexible segmental support member having a supporting surface, said support member being sufficiently rigid to cause said supporting surface to remain substantially flat, a thin and relatively flexible wear plate member having a bearing surface disposed in rubbing relation with said thrust bearing surface, the opposite surface of the wear plate member being disposed against said supporting surface, said wear plate being sufficiently flexible to allow itself to conform to said flat supporting surface under thrust load, means connecting said thin plate member loosely to said support member and permitting differential thermal expansion therebetween, and means for circulating a coolant fluid between the wear plate member and the support member, whereby heat generated by friction at the rubbing surface of the wear plate member is carried away and the support member is maintained at a substantially uniform temperature across the thickness thereof, whereby the support member retains its original shape and the hydraulic and mechanical forces imposed on the thin wear plate member cause it to conform to the shape of the supporting surface of the support member in operation, irrespective of any tendency of the thin wear plate member to deform by reason of thermal differences across the thickness thereof.

3. A segmental type bearing comprising a rotating member defining an annular bearing surface, an annular stationary member spaced from said bearing surface, a plurality of composite bearing shoes disposed between the stationary member and said rotating member bearing surface, each of said shoes comprising a thick support member disposed on the stationary member and defining a support surface facing and spaced from the annular bearing surface, said support member being sufficiently rigid to substantially retain its shape under forces exerted by the rotating member, a thin wear plate member having one surface adapted to be disposed in rubbing relation with the rotating member bearing surface and the opposite surface disposed in contact with said support surface, said wear plate member being sufficiently flexible that it will substantially conform to the shape of said support surface under forces exerted by the rotating member, said wear plate member and support member defining coolant passages at their interface for removing heat generated by friction in the wear plate member to prevent thermal distortion of the support member, and means connecting the wear plate member loosely to the support member for differential thermal movement.

4. A segmental type bearing comprising a rotating member defining an annular bearing surface, an annular stationary member spaced from said bearing surface, and a plurality of composite segmental bearing shoes each comprising a thick support member substantially inflexible under forces imposed in operation in the bearing and defining a support surface facing and spaced from said annular bearing surface, a relatively thin segmental wear plate member disposed in contact with said support surface and having its other surface adapted to cooperate with the annular bearing surface, said wear plate member being sufficiently flexible that it will substantially conform to the shape of said support surface under the forces imposed in operation in the bearing, the portion of the support member contacting the wear plate member defining a plurality of grooves at least some of which discharge at the perimeter of the shoe, at least one inlet port for communicating a coolant fluid to said grooves for removing friction heat generated in the wear plate member during operation, and means loosely connecting the wear plate member to the support member for free differential thermal expansion relative thereto, whereby said wear plate member is free to expand and contract relative to the support member under the influence of heat generated during operation, thereby reducing the tendency of the bearing shoe to deform to an arcuate shape under the influence of any temperature differential developed therein.

5. A segmental thrust bearing comprising a rotating member defining a flat thrust bearing surface, a stationary member including shoe retaining structure axially spaced from said thrust bearing surface, a plurality of segmental composite bearing shoes circumferentially spaced on said shoe retaining structure and arranged to cooperate with the thrust bearing surface, each of said shoes comprising a thick support member defining a substantially flat support surface facing and spaced from the thrust bearing surface and being sufficiently rigid to cause said support surface to remain substantially flat under the forces exerted thereon by said rotating member, a thin wear plate member of good thermal conductivity disposed loosely on the support member for differential thermal expansion therewith having one side disposed in rubbing relation with the thrust bearing surface and the opposite side defining an interface with the support surface, said wear plate having sufficient flexibility to flatten against said second support member surface under the thrust forces exerted by the rotating member, and means to cool the interface between the wear plate and the support member including grooves defined therebetween, whereby the support member second surface will remain substantially flat in order to distribute the load on the wear plate member despite increased temperatures in the wear plate member.

References Cited in the file of this patent

UNITED STATES PATENTS

| | | |
|---|---|---|
| 1,494,010 | Newhouse | May 13, 1924 |
| 1,754,325 | Kingsbury | Apr. 15, 1930 |
| 2,102,534 | Howarth | Dec. 14, 1937 |
| 2,378,343 | Walter | June 12, 1945 |
| 2,479,653 | Walter | Aug. 23, 1949 |

FOREIGN PATENTS

| | | |
|---|---|---|
| 560,588 | Great Britain | Apr. 11, 1944 |
| 269,588 | Switzerland | Oct. 16, 1950 |